US 008066426B2

(12) United States Patent
Sandford et al.

(10) Patent No.: US 8,066,426 B2
(45) Date of Patent: Nov. 29, 2011

(54) MIXING DEVICE CONFIGURED TO BLEND FOOD

(75) Inventors: Michael G. Sandford, Chester, VA (US); Li Xinwen, Shenzhen (CN)

(73) Assignee: Hamilton Beach Brands, Inc., Glen Allen, VA (US)

(*) Notice: Subject to any disclaimer, the term of this patent is extended or adjusted under 35 U.S.C. 154(b) by 946 days.

(21) Appl. No.: 11/716,294

(22) Filed: Mar. 9, 2007

(65) Prior Publication Data
US 2008/0219089 A1 Sep. 11, 2008

(51) Int. Cl.
*A47J 43/046* (2006.01)
(52) U.S. Cl. ........................................................ 366/205
(58) Field of Classification Search .................. 366/314, 366/197–206, 331; 241/199.12, 282.1–282.2; 99/348, 453
See application file for complete search history.

(56) References Cited

U.S. PATENT DOCUMENTS

| | | | |
|---|---|---|---|
| 860,804 A * | 7/1907 | Hescox | 366/314 |
| 1,118,210 A * | 11/1914 | Mills et al. | 74/79 |
| 1,445,112 A | 2/1923 | Titus et al. | |
| 2,117,496 A * | 5/1938 | Osuch | 99/489 |
| 2,761,659 A | 9/1956 | Collura | |
| 2,789,798 A * | 4/1957 | Brace | 366/199 |
| 2,793,841 A * | 5/1957 | Ellins | 366/206 |
| 2,858,861 A | 11/1958 | Appleton | |
| D187,684 S | 4/1960 | Hauser | |
| 2,940,738 A | 6/1960 | Posener et al. | |
| 3,133,570 A * | 5/1964 | Leszczynski | 241/101.01 |
| 3,175,594 A * | 3/1965 | Jepson et al. | 241/199.12 |
| 3,176,968 A | 4/1965 | Appleton | |
| 3,458,175 A * | 7/1969 | Setsuo et al. | 241/282.2 |
| 3,493,214 A | 2/1970 | Edwards et al. | |
| 3,493,215 A | 2/1970 | Edwards et al. | |
| 3,700,176 A * | 10/1972 | Haber | 241/27 |
| 3,738,616 A | 6/1973 | Copeland et al. | |
| D228,698 S | 10/1973 | Barnard et al. | |
| 3,856,220 A * | 12/1974 | Waters | 241/282.1 |
| 3,901,484 A | 8/1975 | Ernster | |
| 4,230,281 A * | 10/1980 | Hill et al. | 241/142 |
| 4,285,473 A * | 8/1981 | Williams | 241/37.5 |
| 4,487,509 A * | 12/1984 | Boyce | 366/199 |
| 4,551,026 A | 11/1985 | Cristante | |
| 4,620,476 A * | 11/1986 | Brym | 99/484 |
| D339,715 S | 9/1993 | Barrault | |
| 5,380,086 A * | 1/1995 | Dickson | 366/97 |
| 5,392,699 A * | 2/1995 | Tai | 99/492 |
| 5,419,633 A * | 5/1995 | Lorenzetti et al. | 366/40 |
| 5,435,237 A * | 7/1995 | Huang | 99/492 |
| 5,735,602 A * | 4/1998 | Salvatore | 366/314 |
| 5,819,641 A * | 10/1998 | Hsu | 99/492 |
| 5,934,582 A * | 8/1999 | Abledu | 241/199.12 |
| D417,815 S | 12/1999 | Endres | |
| D444,344 S | 7/2001 | Barthelemy et al. | |
| 6,499,873 B1 * | 12/2002 | Chen | 366/197 |
| D473,100 S | 4/2003 | Sakai et al. | |

(Continued)

*Primary Examiner* — Charles E Cooley
(74) *Attorney, Agent, or Firm* — Alexander D. Raring

(57) ABSTRACT

A mixing device, configured to blend food, including a housing, having a motor, and a jar removably mounted to the housing for containing food. The housing includes a base, a central body and a pair of side bodies that attach to the sides of the central body in an assembled configuration of the housing. Further, the housing includes a top removably mounted to the base to clamp the side bodies and the central body between the top and the base when the housing is in the assembled configuration.

9 Claims, 6 Drawing Sheets

U.S. PATENT DOCUMENTS

| | | | |
|---|---|---|---|
| 6,588,322 B2 * | 7/2003 | Pavlovic et al. | 99/331 |
| 6,595,113 B1 * | 7/2003 | Chang | 99/337 |
| D478,468 S | 8/2003 | Holderfield et al. | |
| D484,357 S | 12/2003 | Seum et al. | |
| 6,776,086 B1 * | 8/2004 | Chang Chien | 99/492 |
| 6,854,876 B2 * | 2/2005 | Dickson, Jr. | 366/205 |
| 6,966,690 B2 | 11/2005 | Yen | |
| D512,265 S | 12/2005 | McCurrach | |
| 7,063,009 B2 * | 6/2006 | Lin | 99/492 |
| D553,904 S * | 10/2007 | Romandy | D7/378 |
| 7,318,666 B1 * | 1/2008 | Lin et al. | 366/206 |
| 7,320,542 B2 * | 1/2008 | Tai | 366/205 |
| 7,422,362 B2 * | 9/2008 | Sands | 366/205 |
| 7,775,705 B2 * | 8/2010 | Kozlowski et al. | 366/206 |
| 7,828,475 B2 * | 11/2010 | Barber | 366/198 |
| 7,871,195 B2 * | 1/2011 | Larsen et al. | 366/194 |
| 7,959,347 B2 * | 6/2011 | Pryor et al. | 366/142 |
| 2002/0027175 A1 * | 3/2002 | Capp | 241/199.12 |
| 2004/0141412 A1 * | 7/2004 | Midas et al. | 366/217 |
| 2005/0152215 A1 * | 7/2005 | Stuart et al. | 366/205 |
| 2005/0190644 A1 * | 9/2005 | Yen | 366/206 |
| 2006/0002228 A1 * | 1/2006 | Schulz et al. | 366/209 |
| 2006/0002229 A1 * | 1/2006 | Schulz et al. | 366/217 |
| 2006/0176765 A1 * | 8/2006 | Pryor et al. | 366/192 |
| 2008/0089170 A1 * | 4/2008 | Larsen et al. | 366/192 |
| 2008/0089171 A1 * | 4/2008 | Larsen et al. | 366/206 |
| 2008/0219089 A1 * | 9/2008 | Sandford et al. | 366/197 |
| 2010/0246319 A1 * | 9/2010 | Pryor et al. | 366/205 |
| 2011/0096619 A1 * | 4/2011 | Pryor et al. | 366/205 |

* cited by examiner

MIXING DEVICE CONFIGURED TO BLEND FOOD

BACKGROUND OF THE INVENTION

The present invention is directed to a mixing device configured to blend food and, more particularly, to a mixing device or kitchen blender that has a motor housing constructed of a plurality of components similar to the construction of a conventional toaster.

Mixing devices or blenders are a relatively common household or kitchen appliance that are used to blend foodstuff, typically drinks or other foodstuff that are blended into a fluid or semi fluid state. A typical blender includes a base, a collar permanently secured to the base that is adapted for supporting a jar and a lid removably mounted to the top of the jar. The base includes an inverted, cup-shaped base cover which is preferably fabricated from relatively inexpensive, thin sheet metal. The cover is integrally formed of an upper, substantially horizontal wall and an annular, slightly tapered side wall.

To create the base of such a blender, a manufacturer must properly form the sheet metal to the desired shape. This process can be costly and time consuming. Further, shipment and packaging of such blenders can be difficult because of the size and shape of the base and cover. It would be desirable for the base or housing of a blender to be constructed in a similar manner to a conventional toaster. A conventional toaster housing is constructed by assembling various easily manufactured sheet metal surfaces and sides. Specifically, it would be desirable to have the base or housing of a blender be constructed of various pieces that can be quickly and easily created and that can be assembled to form the base or housing of the blender.

BRIEF SUMMARY OF THE INVENTION

Briefly stated, the present invention is directed to a mixing device configured to blend food. The mixing device includes a housing, having a motor, and a jar removably mounted to the housing for containing food. The housing includes a base, a central body and a pair of side bodies that attach to the sides of the central body in an assembled configuration of the housing. Further, the housing includes a top removably mounted to the base to clamp the side bodies and the central body between the top and the base when the housing is in the assembled configuration.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings.

DETAILED DESCRIPTION OF THE INVENTION

Figure 1:
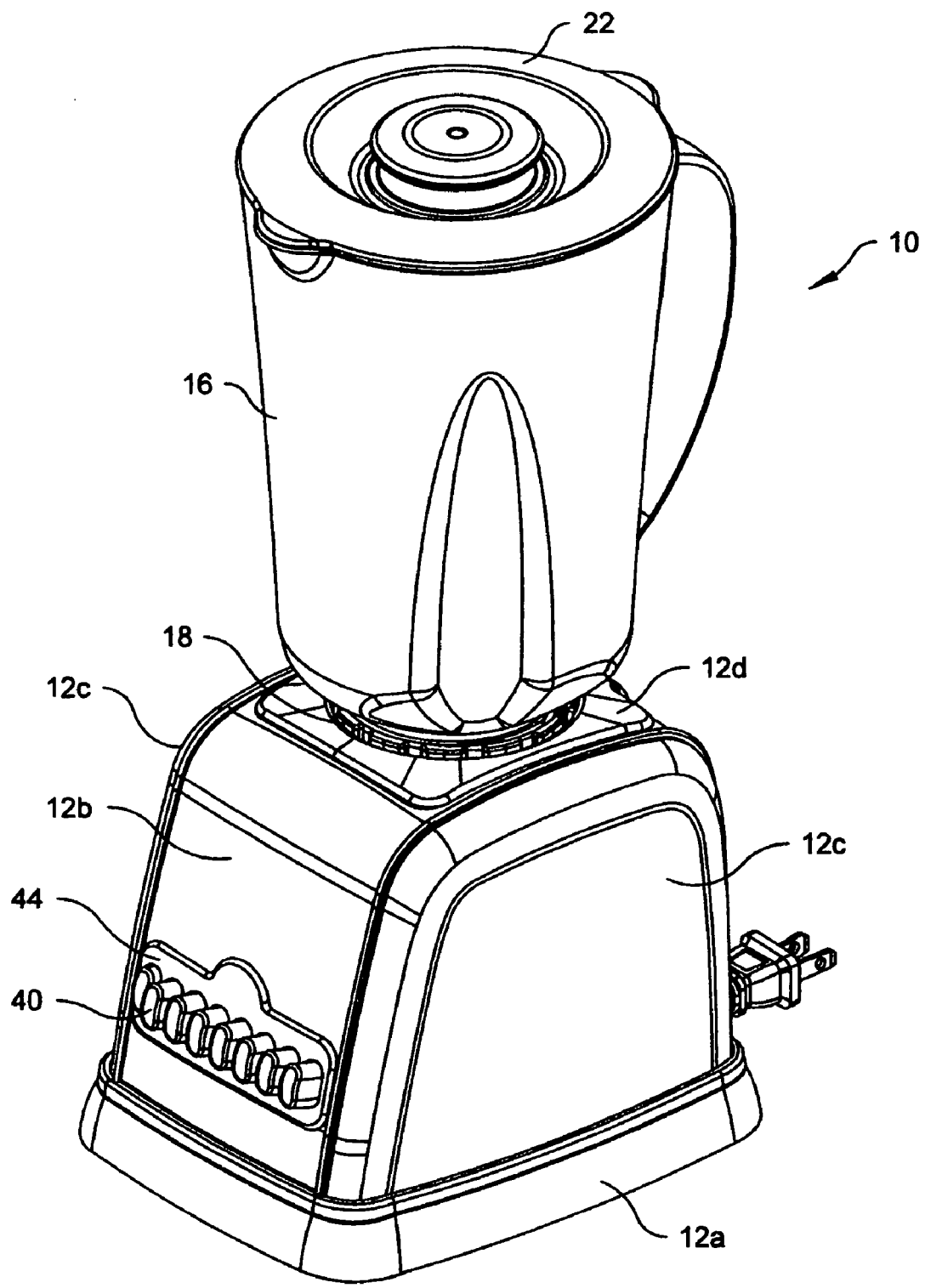
FIG. 1 is a front right perspective view of a preferred embodiment of a mixing device in accordance with the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the dispensing blender and designated parts thereof. The terminology includes the above-listed words, derivatives thereof and words of similar import.

Referring now to the drawings in detail, wherein like numerals are used to indicate the like elements throughout, there is shown is FIGS. 1-6 a preferred embodiment of a mixing device, generally designated 10, configured to blend food (not shown). The mixing device 10 is preferably in the form of a conventional kitchen blender, but could be other products such as a food processor or smoothie machine. The mixing device 10 includes a housing 12 including a motor 14. The housing 12 includes a base 12a, a central body 12b, a pair of side bodies 12c, and a top 12d. The housing 12 also includes a series of control buttons used for controlling the operation and speed of the motor 14, in a manner well understood by those of ordinary skill in the art.

The base 12a is constructed to rest on a supporting surface such as a counter top or table top (not shown) and is preferably formed of a high strength, light weight material, such as a polymeric material. However, it is understood by those skilled in the art that the material used to construct the base 12a can be modified without departing from the spirit and scope of the invention. For example, the base 12a can be constructed of virtually any high strength and light weight material, such as a metallic alloy or sheet metal, that can be formed by the manufacturer in the desired shape. The base 12a is used to support the weight of the mixing device 10 when the mixing device 10 is in the assembled configuration (FIGS. 1 and 2).

Figure 3:
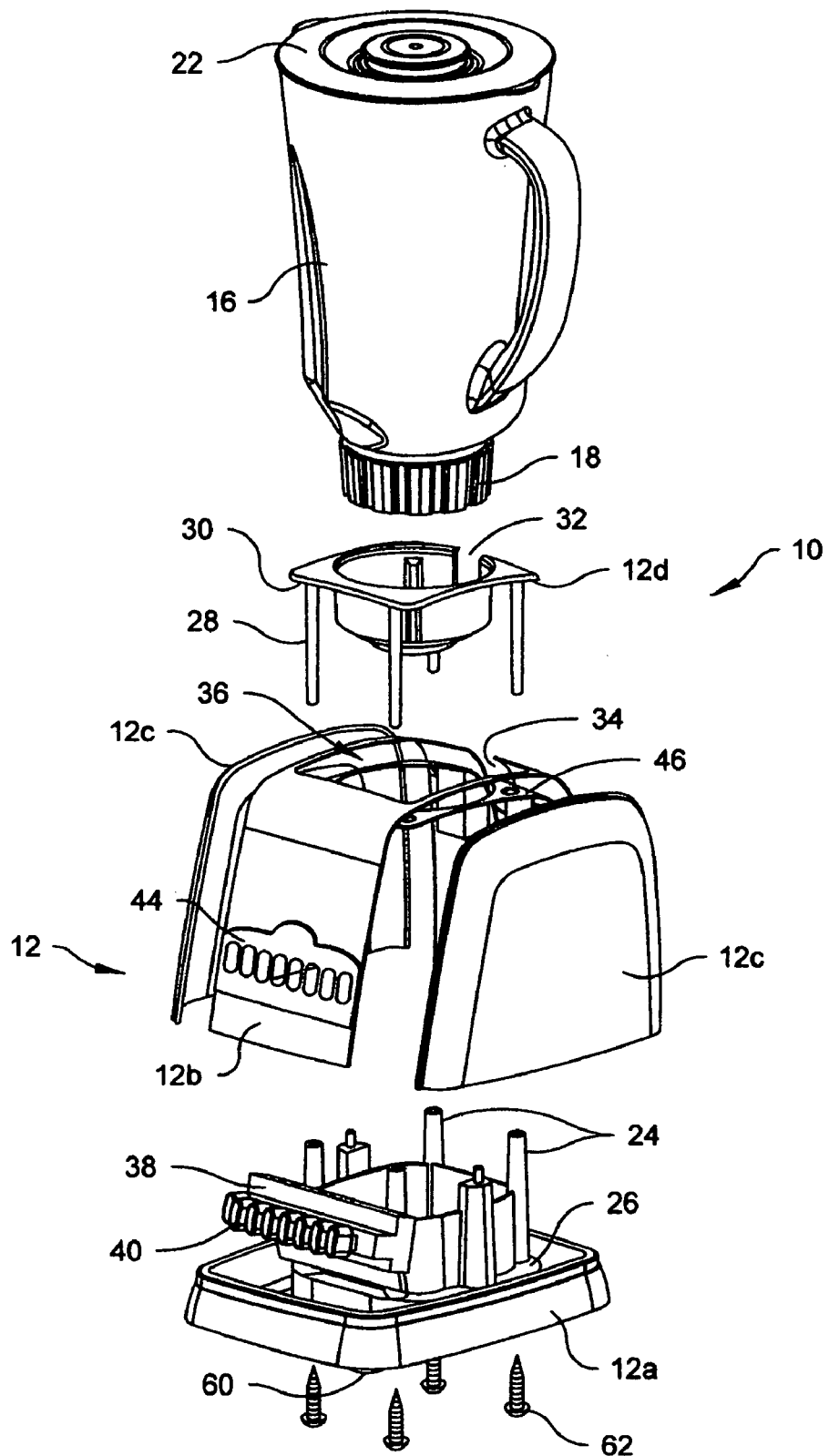
FIG. 3 is an exploded perspective view of the mixing device shown in FIG. 1.

In reference to FIG. 3, at least one and preferably four spaced apart screw bosses 24 extend generally orthogonally from an upper surface 26 of the base 12a. The base 12a also supports a control panel 38, operatively connected to the motor 14 and the plurality of control buttons 40, which extend from the control panel 38. The screw bosses 24, the control panel 38, and the control buttons 40 are also preferably formed of a high strength, light weight material, such as any polymeric material.

Figure 4:
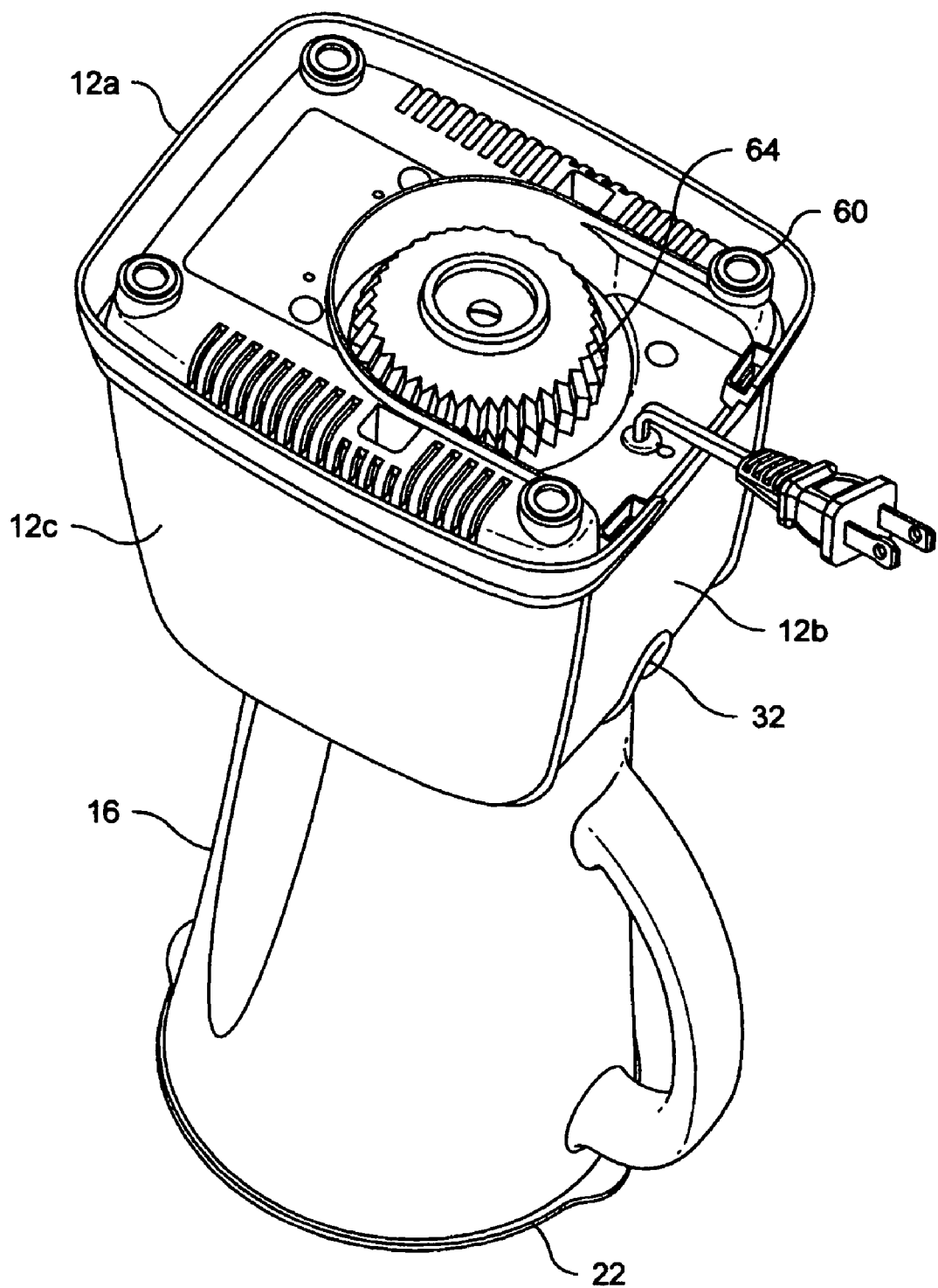
FIG. 4 is a bottom perspective view of the mixing device shown in FIG. 1.

In reference to FIG. 4, the base 12a of the housing 12 includes at least one and preferably four spaced apart feet 60 located at a perimeter of the under side of the base 12a to properly support the base 12a on the countertop or table top and prevent slippage. A power cord, which supplies power to the motor 14 when the power cord is engaged with a conventional wall socket (not shown), extends from underneath the base 12a. The base 12a also includes a circular vent 64 which allows heat created by the motor 14 to escape from the housing 12 when the mixing device 10 is being operated.

Figure 2:
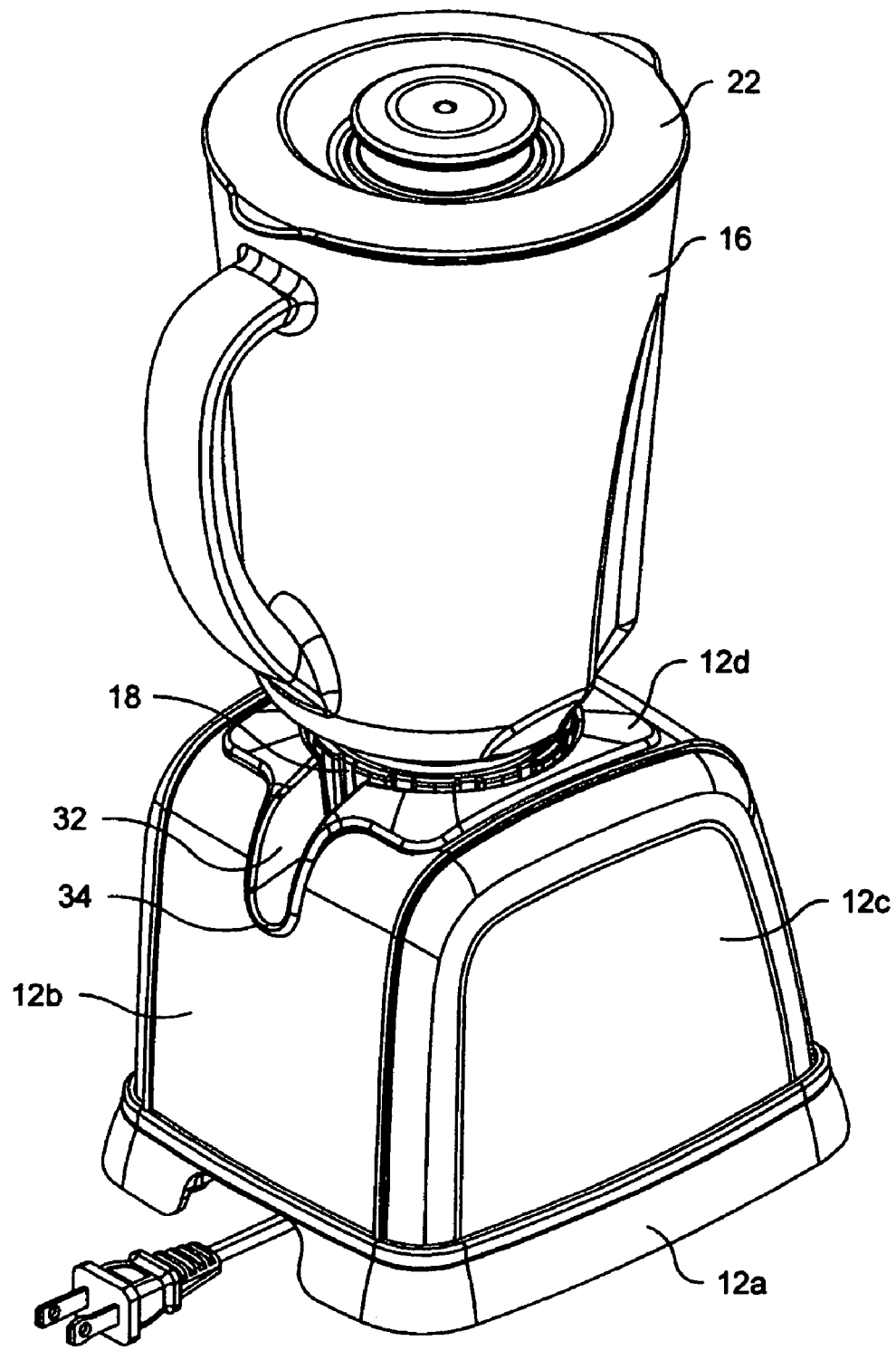
FIG. 2 is a rear left perspective view thereof.

In the preferred embodiment, the side bodies 12c are each attached to the open sides of the central body 12b when the housing is in the assembled configuration (FIGS. 1 and 2). The side bodies 12c preferably define at least a portion of an exterior of the housing 12. Specifically, the side bodies 12c are spot welded to the interior sides of the central body 12b when the housing 12 is in the assembled configuration. However, it is within the spirit and scope of the invention that the side bodies 12c can engage the central body 12b with virtually any type of connection, such as rivets, screws, bolts or a friction fit, to properly secure the side bodies 12c to the central body 12b when the housing 12 is in the assembled configuration. Further, it is understood by those skilled in the art that the central body 12b can include a hem (not shown) around each open side that can trap a flange (not shown) the side bodies 12c when the mixing device is in the assembled configuration.

In the preferred embodiment, the side bodies 12c are each attached to the open sides of the central body 12b when the housing is in the assembled configuration (FIGS. 1 and 2). Specifically, the side bodies 12c are spot welded to the interior sides of the central body 12b when the housing 12 is in the assembled configuration. However, it is within the spirit and scope of the invention that the side bodies 12c can engage the central body 12b with virtually any type of connection, such as rivets, screws, bolts or a friction fit, to properly secure the side bodies 12c to the central body 12b when the housing 12 is in the assembled configuration. Further, it is understood by those skilled in the art that the central body 12b can include a hem (not shown) around each open side that can trap a flange (not shown) the side bodies 12c when the mixing device is in the assembled configuration.

The side bodies 12c are substantially flat mirror images of each other and constructed from sheet metal in the preferred embodiment. However, it is understood by those skilled in the art that the shape of the side bodies 12c and the material used to construct the side bodies 12c can be modified without departing from the spirit and scope of the invention. For example, the side bodies 12c have slightly curved edges where the side bodies 12c attach to the central body 12b. It is within the spirit and scope of the invention to create the side bodies 12c in a more arcuate shape to create a more spherical look to the housing 12 of the mixing device 10. Further, the side bodies 12c can be constructed of virtually any high strength and light weight material, such as a polymeric material, that can be formed by the manufacturer in the desired shape.

In the preferred embodiment, the top 12d is removably mounted to the base 12a to clamp the side bodies 12c and the central body 12b between the top 12d and the base 12a when the housing 12 is in the assembled configuration. The top 12d is preferably formed of a high strength, light weight material, such as a polymeric material. However it is understood by those skilled in the art that the top can be constructed of virtually any high strength, light weight material, such as a metallic alloy. To assure that the top 12d and base 12a clamp the side bodies 12c and central body 12b together, at least one and preferably four screw bosses 28 extend from a lower surface 30 of the top 12d. The screw bosses 28 of the top 12d are inserted and extend into the corresponding screw bosses 24 of the base 12a when the housing 12 is in the assembled configuration. Specifically, each screw boss 28 of the top 12d has a slightly smaller diameter than that of the screw bosses 24 of the base 12a.

Further, the top 12d includes a trough 32 which extends from a rear of the top 12d. The top 12d is located within the opening 36 of the central body 12b when the housing 12 is in the assembled configuration. The trough 32 is preferably sized and shaped to engage the slot 34 of the central body 12b when the top 12d is located within the opening 36 of the central body 12b. The trough 32 of the top 12d and the slot 34 of the central body 12b assure that the central body 12b is properly aligned when the housing 12 of the mixing device 10 is being assembled. Further, the trough 32 can provide a passage through which spilled foodstuff or beverages that land on the top 12d of the housing 12 to drain away from the control buttons 40. It is understood by those skilled in the art that the size and shape of the trough 32 and complimentary slot 34 can be modified without parting from the spirit and scope of the invention. For example, a two or more troughs (not shown) can extend from the top 12d at virtually any location to engage a slot 34 virtually anywhere on either the central body 12b or the side bodies 12c.

Referring to FIGS. 1-3, a jar 16 is removably mounted to the housing 12 for containing food (not shown). The jar 16 is preferably transparent, is open at its top and has a collar 18 mounted to its bottom. The jar 16 is preferably formed of a high strength, light weight material, such as annealed Borosilicate. However it is understood by those skilled in the art that the jar 18 could be formed of a variety of materials, such as glass, styrene acrylonitrile (SAN) or a metallic material, without departing from the spirit and scope of the invention. A lid 22 is removably mountable to the jar 16. In the preferred embodiment, the jar has a handle to allow a user to easily remove the jar 16 from the housing 12. However it is within the spirit and scope of the invention that the jar 16 may not include a handle or that a handle is removably attached to the jar 16 or pivotably attached to the jar 16. In the preferred embodiment, the collar 18 includes a blending tool 20 that is operatively engaged with the motor 14 when the jar 16 is positioned on the housing 12.

Figure 5:
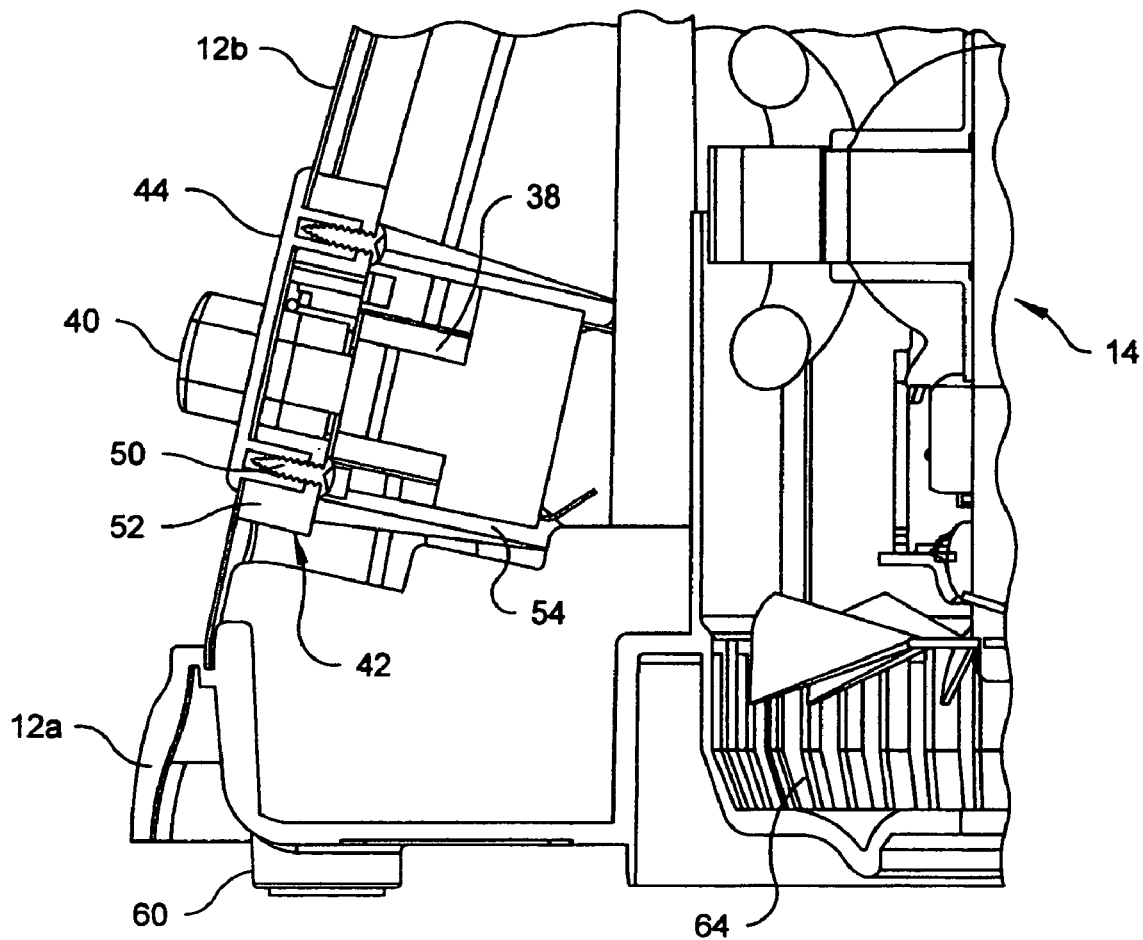
FIG. 5 is a cross-sectional elevational view of the right side a housing of the mixing device shown in FIG. 1.

In reference to FIG. 5, a clamp 42, located inside the housing 12, secures a bezel 44 to an exterior surface of the central body 12b and retains the control panel 38 inside the housing 12. The clamp 42 includes a base 52 positioned against an interior surface of the central body 12b with screws 50 when the housing 12 is in the assembled configuration. The clamp 12 also has at least one, but preferably four, clamping arm 54, which grips a rear surface of the control panel 38. Screws 50 attach the base 52 of the clamp 42 to the bezel 44 inside the housing 12. The bezel 44 surrounds each control button 40 of the control panel 38 to assure that the central body 12b does not scratch or tear the control buttons 40. It is understood by those skilled in the art that the bezel 44 can be constructed of virtually any material that will prevent the central body 12b from scratching the control buttons 40 as the control buttons 40 are pushed by the user. For example, the bezel 44 can be constructed of a polymeric material, a rubber or any other forgiving material that would prevent the control buttons 40 from being scratched. The clamp 42 is preferably formed of a polymeric material, but can be constructed of virtually any high strength, light weight material, such as a metallic alloy, without departing from the spirit and scope of the invention.

Figure 6:
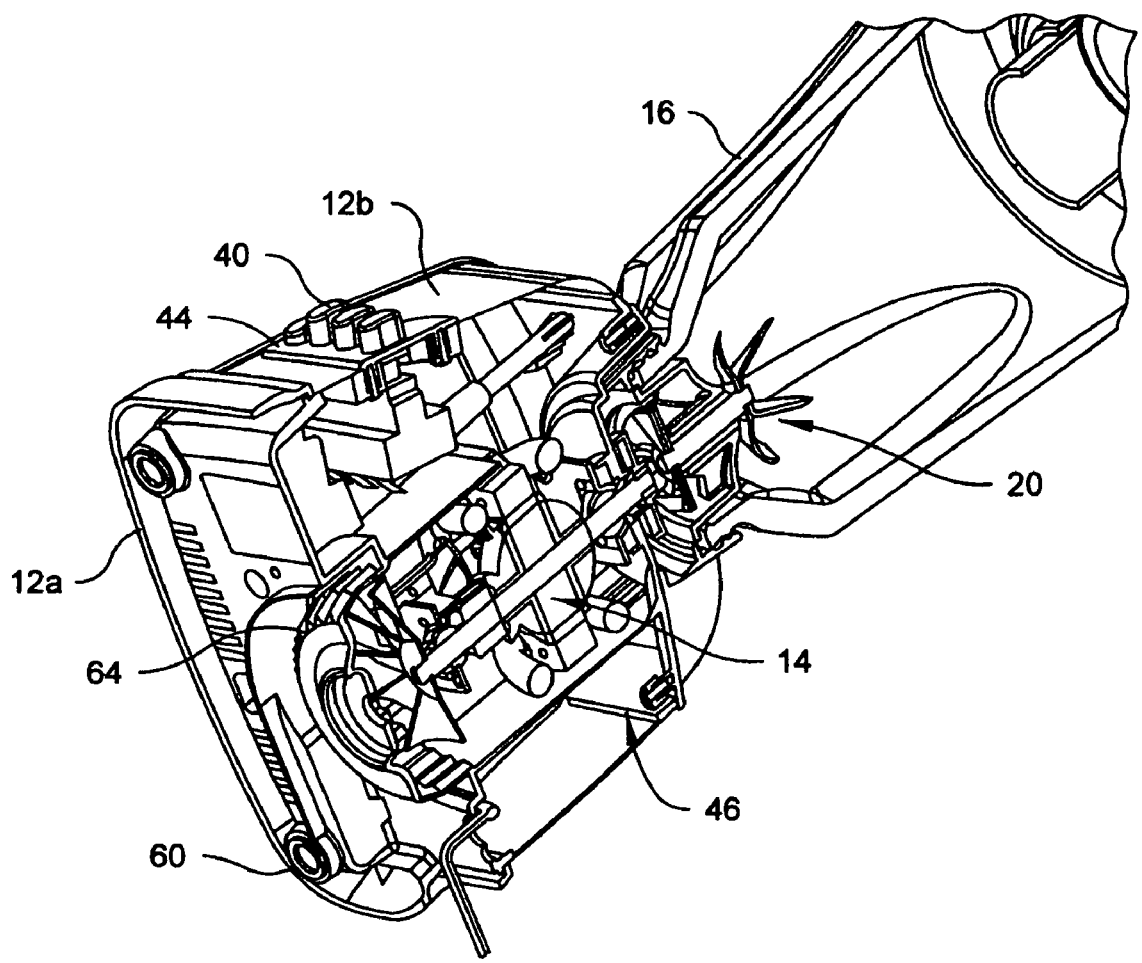
FIG. 6 is a cross-sectional perspective view of the right side of the mixing device shown in FIG. 1.

In reference to FIGS. 3 and 6, a plate 46 is located beneath the top 12d and the upper portion of the central body 12b to assure that the central body 12b, side bodies 12c and top 12d are properly secured when the housing 12 is in the assembled configuration. Specifically, a plurality of screws (not shown), inserted on the bottom side of the plate 46, removably attach the plate 46 to the lower surface 30 of the top 12d and clamp a portion of the central body 12b in between. In the preferred embodiment, the plate 46 is generally planer, or flat in shape. However, it is understood by those skilled in the art that the shape of the plate 46 can be modified without departing from the spirit and scope of the invention. For example, the shape of the plate 46 can be of virtually any shape that assures that the top 12d and plate 46 properly secure the central body 12b when the housing 12 is in the assembled configuration. It is also understood by those skilled in the art that the plate 46 can be constructed of virtually any high strength, light weight material, such as a polymeric material or metallic alloy, without departing from the spirit and scope of the invention.

To assemble the housing 12 of the mixing device 10, a manufacturer or user would place the base 12a on a countertop or table top. The motor 14, the control panel 38 and the control buttons 40 are supported by and attached to the base 12a. Next, the user or manufacturer would attach the side bodies 12c to each of the open sides of the central body 12b, preferably by spot welding. The user or manufacturer would then place the top 12d through the central opening 36 of the central body 12b making sure to properly align the trough 32 of the top 12d within the recess 34 of the central body 12b. The user or manufacturer would then invert the assembled central body 12b, side bodies 12c and top 12d to secure the plate 46 to the lower surface 30 of the top 12d. The plate 46 would then be screwed onto the lower surface 30 of the top 12d to clamp a portion of the central body 12b in between.

At this point, the assembled central body 12b, side bodies 12c, top 12d and plate 46 are again inverted to the upright configuration and this assembly is placed over the base 12a making sure to properly align the screw bosses 28 of the top 12d with the screw bosses 24 of the bottom 12a and the openings of the central body 12b with the control buttons 40. Before this assembly is completely lowered such that the central body 12b and side bodies 12c are in abutting contact with the base 12a, a user or manufacturer attaches the bezel 44 to the front surface of the central body 12b. A user or manufacturer than screws the base of the clamp 42 to the interior surface of the central body 12b and to the bezel 44. Next, the clamping arms 54 of the clamp 42 are attached to the rear surface of the control panel 38.

Next, the user or manufacturer completely lowers the assembled central body 12b, side bodies 12c, top 12d, plate 46 and clamp 42 onto the base 12a such that a drive shaft extending from the motor 14 extends through a central opening of the top 12d to form the assembled housing 12. Then, the assembled housing 12 is inverted to insert screws 62 into the screw openings of the base 12a to secure the screw bosses 28 of the top 12d to the screw bosses 24 of the base 12a. Once the assembled housing 12 is inverted again to the upright position, the user of manufacturer places the jar 16 and collar 18 onto the top 12d to operatively connect the blending tool 20 to the motor 14 via the drive shaft. Once the user or manufacturer inserts the power cord into a conventional wall socket, the mixing device 10 is ready to blend food stuff.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

We claim:

1. A mixing device configured to blend food, said device comprising:
   a) a housing, including a motor, comprising:
      a base;
      a central body, the central body having open sides when the housing is not in an assembled configuration;
      an opening located on an upper portion of the central body;
      a pair of side bodies that attach to the open sides of said central body in said assembled configuration of said housing, said side bodies defining at least a portion of an exterior of said housing;
      a top removably mounted to said base to clamp said side bodies and said central body between said top and said base when said housing is in said assembled configuration, the top located within the opening of the central body when the housing is in said assembled configuration; and
   b) a jar removably mounted to said housing for containing food, said jar including a collar, said collar including a blending tool operatively engaged with said motor when said jar is positioned on said housing.

2. A device in accordance with claim 1, further including a lid removably mountable to a mouth of said jar.

3. A device in accordance with claim 1, wherein at least one screw boss extends from an upper surface of said base and at least one screw boss extends from a lower surface of said top, said screw boss of said top extending into said screw boss of said base when said housing is in said assembled configuration.

4. A device in accordance with claim 1, wherein said central body is arcuate in shape and constructed from sheet metal.

5. A device in accordance with claim 1, wherein said side bodies are substantially flat and constructed from sheet metal.

6. A device in accordance with claim 1, wherein said top includes a trough and said central body includes a slot, said trough engaging said slot when said housing is in said assembled configuration.

7. A device in accordance with claim 1, further including a bezel attached to an exterior surface of said central body and a clamp attached to an interior surface of said central body.

8. A device in accordance with claim 7, wherein said clamp includes a base attached to said interior surface of the central body with screws when said housing is in said assembled configuration and at least one clamping arm that grips a rear surface of a control panel operatively connected to said motor.

9. A device in accordance with claim 1, further including a plate removably mounted beneath said top and an upper portion of said central body to assure that said central body and said top are properly secured when said housing is in said assembled configuration.

* * * * *